(12) United States Patent
Johnson

(10) Patent No.: US 6,783,320 B2
(45) Date of Patent: Aug. 31, 2004

(54) PRESSURIZED GAS TURBINE ENGINE WITH ELECTROTHERMODYNAMIC ENHANCEMENT

(75) Inventor: Neldon P. Johnson, Salem, UT (US)

(73) Assignee: International Automated Systems, Inc., Salem, UT (US)

( * ) Notice: Subject to any disclaimer, the term of this patent is extended or adjusted under 35 U.S.C. 154(b) by 0 days.

(21) Appl. No.: 10/391,397

(22) Filed: Mar. 18, 2003

(65) Prior Publication Data

US 2004/0005214 A1 Jan. 8, 2004

Related U.S. Application Data

(63) Continuation-in-part of application No. 09/814,498, filed on Mar. 21, 2001, now Pat. No. 6,533,539.

(51) Int. Cl.[7] ................................................. F01D 1/18
(52) U.S. Cl. .......................................... 415/80; 415/10
(58) Field of Search ............................... 415/80, 81, 82, 415/10

(56) References Cited

U.S. PATENT DOCUMENTS

| | | | |
|---|---|---|---|
| 824,113 A | 6/1906 | Groshon | 415/82 |
| 890,392 A | 6/1908 | Adams | 415/80 |
| 2,569,997 A | 10/1951 | Kollsman | 415/80 |
| 4,206,396 A | 6/1980 | Marks | 322/2 |
| 4,395,648 A | 7/1983 | Marks | 310/10 |
| 4,430,042 A | 2/1984 | House | 415/1 |
| 4,433,248 A | 2/1984 | Marks | 290/44 |
| 4,494,009 A | 1/1985 | Yukl | 290/55 |
| 4,523,112 A | 6/1985 | Marks | 310/10 |
| 5,219,270 A | 6/1993 | Titmas | 415/80 |
| 5,525,034 A | 6/1996 | Hays | 415/80 |

Primary Examiner—Edward K. Look
Assistant Examiner—Kimya N McCoy
(74) Attorney, Agent, or Firm—J. David Nelson

(57) ABSTRACT

Pressurized gas turbine engine with efficiency enhanced by an electrothermodynamic power convertor. The turbine has peripheral nozzles which are supplied with pressurized gas or pressurized liquid by internal nozzle gas ways. Pressurized liquid is flashed by the nozzles. The electrothermodynamic power convertor has a collector plate which envelopes the turbine engine expansion chamber and a charged screen which is positioned radially between the gas nozzles and the collector plate. Collector plate insulation is affixed between the collector plate and the walls of the expansion chamber.

19 Claims, 2 Drawing Sheets

US 6,783,320 B2

PRESSURIZED GAS TURBINE ENGINE WITH ELECTROTHERMODYNAMIC ENHANCEMENT

PRIOR RELATED APPLICATION

This invention is a continuation-in-part of U.S. Patent application, application Ser. No. 09/814,498 filed Mar. 21, 2001 now U.S. Pat. No. 6,533,539.

FIELD OF THE INVENTION

This invention is in the field of turbine engines and in particular in the field of electrothermodynamically enhanced pressurized gas driven turbine engines.

BACKGROUND OF THE INVENTION

Pressurized gas turbine engines utilizing peripheral nozzles are known in the art. Similarly, the pressurized gas turbine of the present inventor disclosed in the prior related application utilizes peripheral nozzles which discharge pressurized gas oblique to the direction of rotation of the turbine. Maximizing the efficiency of engines, including pressurized gas turbines is becoming increasingly important in these times of energy shortages and high energy prices. In particular, means are needed to provide for the use of electrothermodynamic technology with steam turbines including steam turbines having nozzles which provide for flashing of hot water in the nozzles. This capability can provide a benefit for conventional geothermal generator facilities which normally require the flashing of hot water extracted from the geothermal well to steam with the steam then being passed to the turbine. This results in a substantial loss of energy from the water in converting it to steam. The direct flashing of the hot water in the nozzles increases the efficiency substantially. The utilization of electrothermodynamic technology with such turbines offers the possibility of further efficiency enhancements.

An objective of the present invention is to provide for the electrothermodynamic enhancement of pressurized gas turbines.

A further objective of the present invention is to provide for the electrothermodynamic enhancement of pressurized gas turbines with peripheral nozzles.

A still further objective of the present invention is to provide for the electrothermodynamic enhancement of pressurized gas turbines with direct flashing of heated water to steam in gas nozzles which power the turbine.

SUMMARY OF THE INVENTION

Preferred embodiments of the pressurized gas turbine engine of the present invention shown is comprised of a turbine, a turbine body and an electrothermodynamic power convertor, hereinafter also referred to as an ETD. The ETD is comprised of an electric charged screen, a collector plate, and collector plate insulation between the collector plate and the engine outer shell. For this embodiment the turbine has at least two gas nozzles which are hydraulically connected by nozzle gas ways to an internal shaft gas way in the turbine shaft. For this embodiment, the turbine body has a turbine chamber with an expansion chamber enclosing the turbine and the electric charged screen. The charged screen is positioned radially between the turbine and the collector plate. For some embodiments, the charged screen completely envelopes the turbine.

The charged screen is used to ionize the gas as it passes through the charged screen. The collector plate is used to collect the charge of the ionized gas. Collector plate insulation is used to prevent the charge collected by collector plate from discharging directly to ground. An electric charge source is connected to the charged screen and ground. The collector plate is connected to ground through a load. This completes the circuit to provide electrical energy from the ETD generator in addition to the rotational energy obtained through the turbine, which may be extracted by an electric generator or by other means well known in the industry.

A shaft gas way gas outer wall and a shaft gas way vacuum chamber inside the outer wall, may be used to provide insulation against energy loss in the shaft gas way. An electric generator may be connected with the output shaft by a shaft coupling, which connects the output shaft to the turbine shaft. A rotor nut secures the turbine shaft to the shaft coupling. A high pressure gas seal provides for a seal between the shaft gas way and the turbine. A main shaft bearing supports the turbine. Support braces stabilize the gas seal and the shaft bearing, thereby stabilizing the turbine. The support braces also stabilize the charged screen.

As the gas passes through the screen, the charge on the gas molecules is increased due to an induction process on the ions themselves. As the ions reach the collector plate the ions are absorbed. This collapses the magnetic field of each ion and the energy is converted to an electric current. This movement of charge to the collector plate where the charge is extracted is the electric current which adds to the total energy output of the turbine and provides an additional energy output that otherwise would be lost.

DETAILED DESCRIPTION

Figure 1:
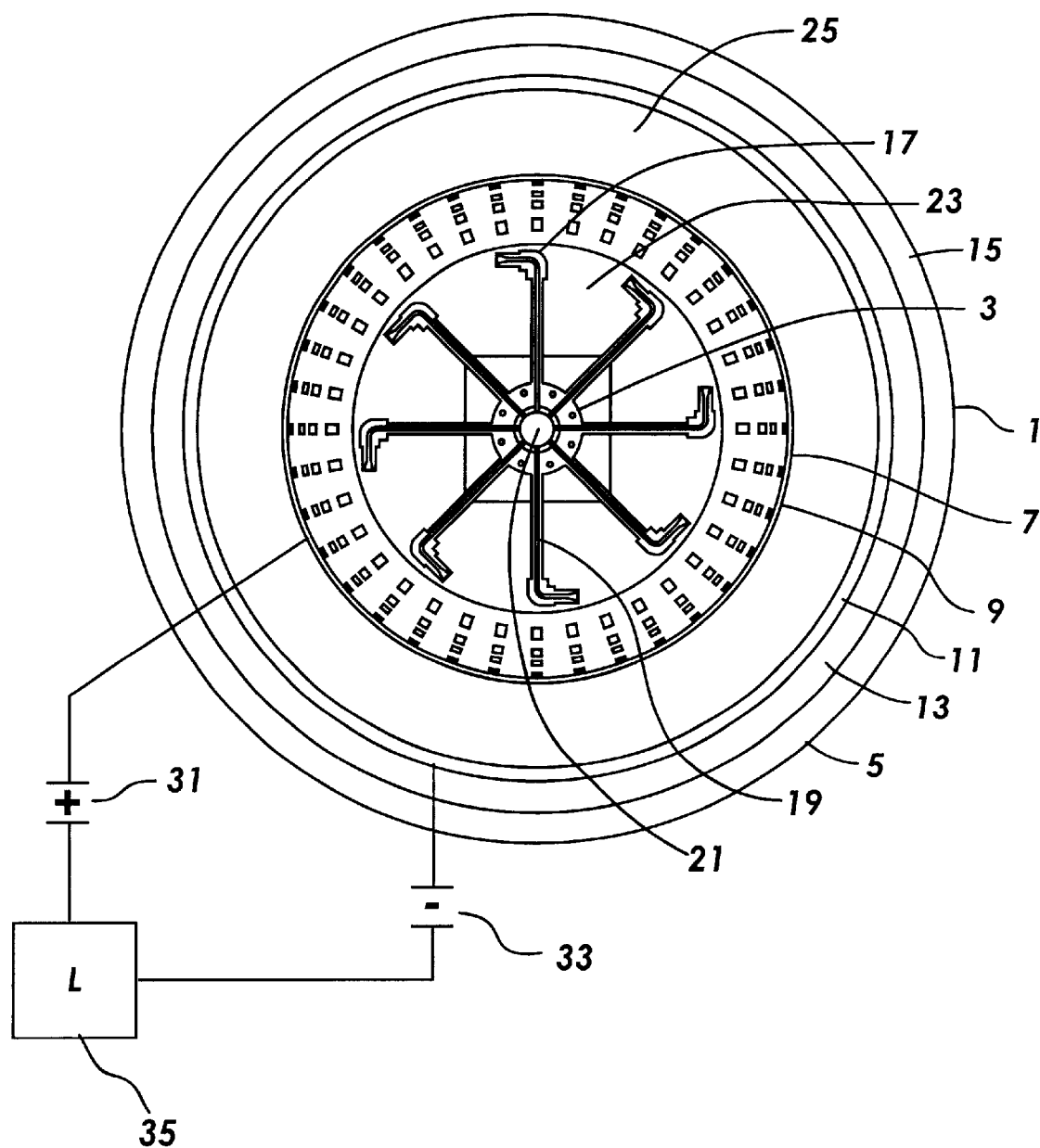
FIG. 1 is a vertical cross-section of an embodiment of the pressurized gas turbine engine of the present invention with an electrothermodynamic power converter of the present invention.

Referring first to FIG. 1, the preferred embodiments of the pressurized gas turbine engine 1 of the present invention shown is comprised of a turbine 3, a turbine body 5 and an electrothermodynamic power convertor 7, hereinafter also referred to as an ETD. The ETD is comprised of an electric charged screen 9, a collector plate 11, and collector plate insulation between the collector plate and the engine outer shell 15. For this embodiment the turbine has at least two gas nozzles 17 which are hydraulically connected by nozzle gas ways 19 to an internal shaft gas way 21 in the turbine shaft. For this embodiment, the turbine body 5 has a turbine chamber 23 with an expansion chamber 25 enclosing the turbine and the electric charged screen 9. The charged screen is positioned radially 29 between the turbine 3 and the collector plate 11. For some embodiments, the charged screen completely envelopes the turbine.

The charged screen is used to ionize the gas as it passes through the charged screen. The collector plate is used to collect the charge of the ionized gas. Collector plate insulation 13 is used to prevent the charge collected by collector plate from discharging directly to ground. An electric charge source 31 is connected to the charged screen and ground 33. The collector plate is connected to ground through a load 35. This completes the circuit to provide electrical energy from the ETD generator in addition to the rotational energy obtained through the turbine, which may be extracted by an electric generator 41 as shown on FIG. 2 or by other means well known in the industry.

Figure 2:
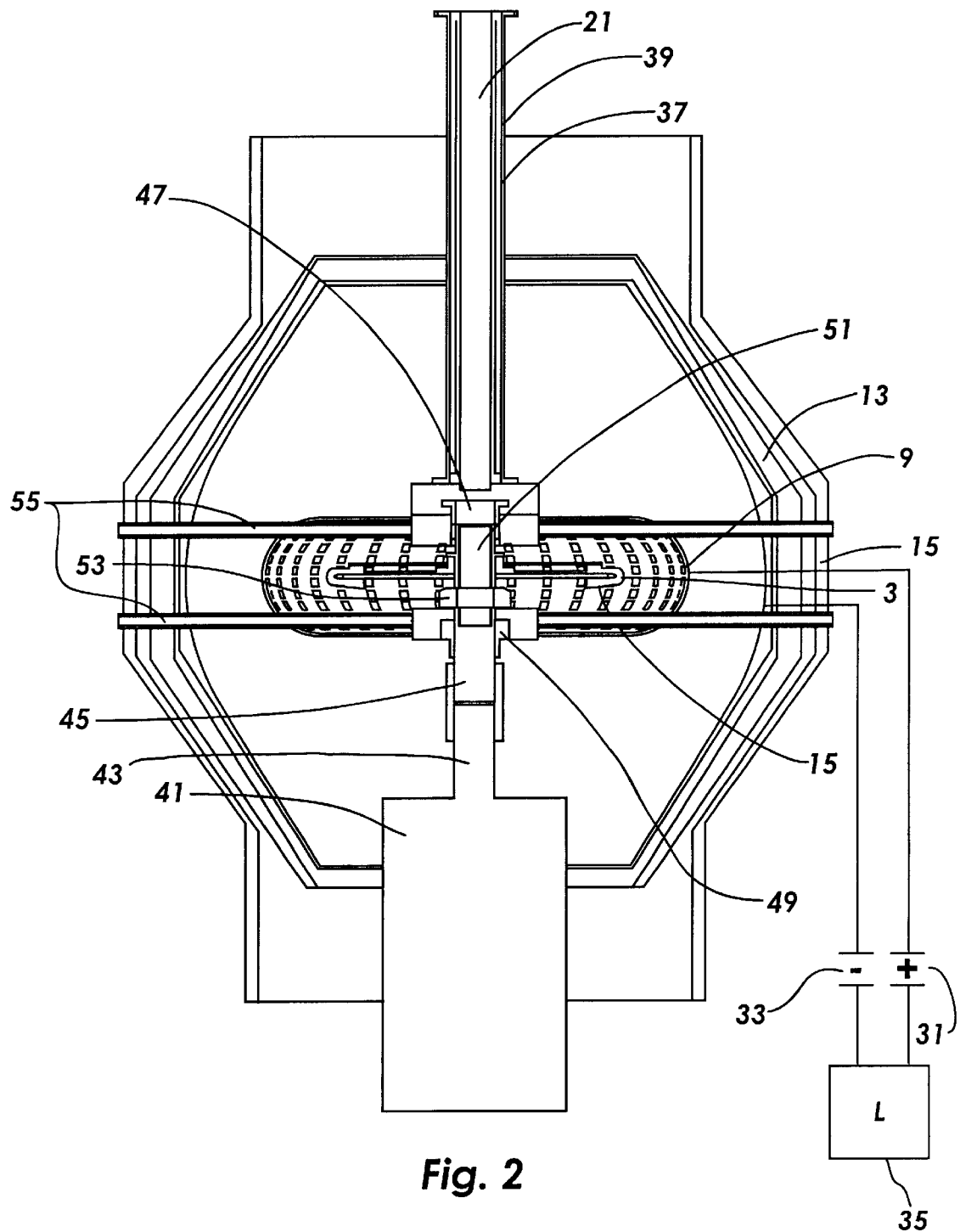
FIG. 2 is a horizontal cross-section of an embodiment of the pressurized gas turbine engine of the present invention with an electrothermodynamic power converter of the present invention.

While the embodiment shown in FIG. 1 utilizes a single shaft gas way 21 for a turbine gas intake, other embodiments incorporating an electrothermodynamic power convertor utilize multiple shaft gas ways or other means for multiple turbine gas intakes which will be known to persons skilled in the art. Referring now to FIG. 2, a shaft gas way gas outer wall 37 and a shaft gas way vacuum chamber 39 inside the outer wall, may be used to provide insulation against energy loss in the shaft gas way. An electric generator 41 may be connected with the output shaft 43 of the turbine to the turbine by a shaft coupling 45, which connects the output shaft to the turbine shaft 51. A rotor nut 52 secures the turbine shaft to the shaft coupling. A high pressure gas seal 47 provides for a seal between the shaft gas way and the turbine. A main shaft bearing 49 supports the turbine. Support braces 55 stabilize the gas seal and the shaft bearing, thereby stabilizing the turbine. The support braces also stabilize the charged screen.

As the gas passes through the screen, the charge on the gas molecules is increased due to an induction process on the ions themselves. As the ions reach the collector plate the ions are absorbed. This collapses the magnetic field of each ion and the energy is converted to an electric current. This movement of charge to the collector plate where the charge is extracted is the electric current which adds to the total energy output of the turbine and provides an additional energy output that otherwise would be lost.

The present invention can also be used with simplified, high efficiency generator systems which rely on the direct flashing of hot water to steam in the nozzles. This has use for a number of applications such a geothermal wells which usually rely on superheated water extracted from the wells. The high energy losses which occur as hot water is flashed to steam and the steam is then used to power the turbine are substantially reduced through the direct flashing of superheated water as it is passed through the gas nozzles of the present invention which are then electrothermodynamically enhanced.

Other embodiments of the invention and other variations and modifications of the embodiments described above will be obvious to a person skilled in the art. Therefore, the foregoing is intended to be merely illustrative of the invention and the invention is limited only by the following claims.

What is claimed is:

1. Pressurized gas turbine engine comprising:
    a) pressurized gas turbine having a plurality of gas nozzles and one or more nozzle gas ways, each gas nozzle being affixed at the perimeter of the turbine in a respective nozzle position, each of the gas nozzles having a respective axis forming an oblique angle with the direction of rotation of the perimeter of the turbine at the respective nozzle position, and each gas nozzle being hydraulically connectable to one or more sources of pressurized fluid by one or more nozzle gas ways;
    b) turbine engine body enclosing the turbine in a turbine chamber, the turbine engine body having an expansion chamber in the turbine chamber; and
    c) electrothermodynamic power convertor.

2. Pressurized gas turbine engine as recited in claim 1 wherein the electrothermodynamic power convertor comprises a collector plate which envelopes the expansion chamber and a charged screen which is positioned radially in the expansion chamber between the gas nozzles and the collector plate.

3. Pressurized gas turbine engine as recited in claim 2 wherein the charged screen envelopes the turbine in the expansion chamber.

4. Pressurized gas turbine engine as recited in claim 2 further comprising collector plate insulation affixed between the collector plate and the walls of the expansion chamber.

5. Pressurized gas turbine engine as recited in claim 1 wherein each of the nozzles further comprises a gas exit cone.

6. Pressurized gas turbine engine as recited in claim 1 wherein each of the nozzles is a flash nozzle providing for flashing pressurized liquid to pressurized gas at the gas nozzle.

7. Pressurized gas turbine engine as recited in claim 1, wherein the nozzle gas ways are sized to provide for the transmission of pressurized liquid to the gas nozzles, and each of the nozzles is a flash nozzle providing for flashing pressurized liquid to pressurized gas at the gas nozzle.

8. Pressurized gas turbine engine as recited in claim 1 wherein each of the gas nozzles is affixed to the perimeter of the turbine and hydraulically connected to one or more nozzle gas ways by a respective nozzle support tube.

9. Pressurized gas turbine engine comprising:
    a) turbine having a plurality of gas nozzles, one or more nozzle gas ways, one or more turbine gas intakes, and a turbine shaft, each gas nozzle being affixed at the perimeter of the turbine in a respective nozzle position, each of the gas nozzles having a respective axis forming an oblique angle with the direction of rotation of the perimeter of the turbine at the respective nozzle position, each nozzle gas way being hydraulically connected to one or more gas nozzles, and each turbine gas intake being hydraulically connected to at least one gas nozzle by a nozzle gas way;
    b) turbine engine body enclosing the turbine in a turbine chamber, the turbine engine body having a front wall and a rear wall, the front wall having one or more engine gas ports, and the rear wall having a shaftway passing the turbine shaft; and
    c) electrothermodynamic power convertor.

10. Pressurized gas turbine engine as recited in claim 9 wherein the electrothermodynamic power convertor comprises a collector plate which envelopes the expansion chamber and a charged screen which is positioned radially in the expansion chamber between the gas nozzles and the collector plate.

11. Pressurized gas turbine engine as recited in claim 10 wherein the charged screen envelopes the turbine in the expansion chamber.

12. Pressurized gas turbine engine as recited in claim 10 further comprising collector plate insulation affixed between the collector plate and the walls of the expansion chamber.

13. Pressurized gas turbine engine as recited in claim 9 wherein each of the nozzles further comprises a gas exit cone.

14. Pressurized gas turbine engine as recited in claim 9 wherein each of the nozzles is a flash nozzle providing for flashing pressurized liquid to pressurized gas.

15. Pressurized gas turbine engine as recited in claim 9, wherein the turbine gas intakes and the nozzle gas ways are sized to provide for the transmission of pressurized liquid to the gas nozzles, and each of the nozzles is a flash nozzle providing for flashing pressurized liquid to pressurized gas at the gas nozzle.

16. Pressurized gas turbine engine as recited in claim 9 wherein each of the gas nozzles is affixed to the perimeter of the turbine and hydraulically connected to one or more nozzle gas ways by a nozzle support tube.

17. Electrothermodynamic power convertor for enhancing the efficiency of a pressurized gas turbine, the turbine having peripheral gas nozzles, the electrothermodynamic power convertor comprising a collector plate which envelopes the turbine and a charged screen which is positioned radially between the gas nozzles and the collector plate.

18. Electrothermodynamic power convertor as recited in claim 17 wherein the charged screen envelopes the turbine.

19. Electrothermodynamic power convertor as recited in claim 17 wherein the collector plate has an outside surface and wherein the electrothermodynamic power convertor further comprising collector plate insulation affixed to the collector plate outside surface.

* * * * *